SEMI-CONDUCTIVE DEVICE

Filed July 1, 1955

INVENTOR
PIETER JOHANNES WILHELMUS JOCHEMS
LEONARD JOHAN TUMMERS
BY Fred M Vogel
AGENT United States Patent Office 2,868,683

Patented Jan. 13, 1959

2,868,683

SEMI-CONDUCTIVE DEVICE

Pieter Johannes Wilhelmus Jochems and Leonard Johan Tummers, Eindhoven, Netherlands, assignors, by mesne assignments, to North American Philips Company, Inc., New York, N. Y., a corporation of Delaware Application July 1, 1955, Serial No. 519,577

Claims priority, application Netherlands July 21, 1954

4 Claims. (Cl. 148—33)

This invention relates to semi-conductive devices or blocking-layer electrode systems comprising a semi-conductive member with at least one electrode which, together with said member, constitutes a rectifying contact, and more particularly to crystal diodes or transistors.

In such systems, the operation of which is highly dependent on the presence of so-called minority carriers in the semi-conductive member, said operation is detrimentally affected by recombination of minority charge carriers with the majority carriers in the semi-conductive material.

One result of said recombination in transistors is, for example, a lower current-amplification factor $\alpha$.

The invention is based on the realisation that at the surface of a semi-conductive member of a given conductivity type, either p- or n-type, a layer of semi-conductive material of the opposite conductivity type is usually present.

The invention has for its object to prevent the appearance of such a layer.

In accordance with the invention, the conductivity type of the semi-conductive member at the surface of said member, except for the part or those parts covered with a rectifying or other electrode, evidences itself to a higher degree than in the remainder of the member.

This consequently means that the concentration of the majority carriers in the surface of the member is higher than in the remainder of the member.

Figure 1:
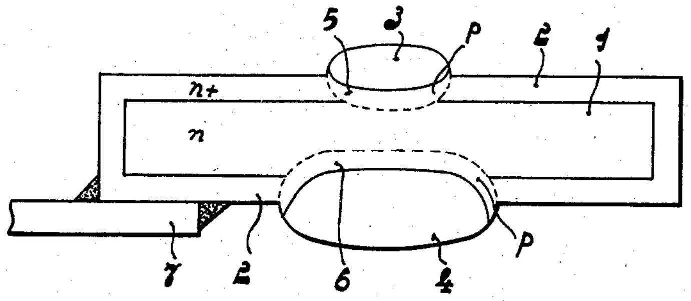
Figure 2:
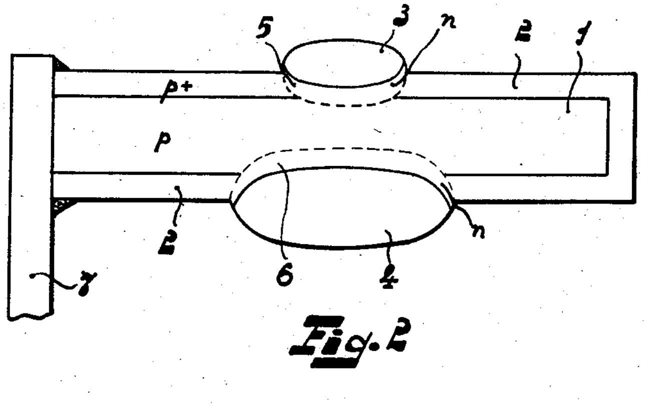

In order that the invention may readily be carried into effect it will now be described with reference to the accompanying drawing showing two examples thereof and in which Figs. 1 and 2 represent a transistor on an enlarged scale.

The transistor shown in Fig. 1 consists of a disc or wafer of semi-conductive material 1 of n-type conductivity, for example antimony-containing germanium having a specific resistance of 5 ohm-cm. In the case under review the majority carriers are consequently free electrons. The surface 2 of the disc 1 shows a stronger n-type, i. e., of higher conductivity, so that the concentration of free electrons therein is higher. This may be realised by heating the disc for 50–100 seconds at 750° C. in an atmosphere consisting of a neutral gas like argon with an admixture of the vapour of a donor, for example an antimony compound such as $SbCl_3$ at a pressure of a few millimeters of mercury pressure. This treatment will lead to a considerable reduction of the specific resistivity of the germanium at the surface. At the surface the resultant value may be less than 0.1 ohm-cm. The influence of the treatment diminishes with the distance from the surface; at a distance of some two or three microns the germanium will show its original resistivity. Subsequently, an emitter 3 and a collector 4 consisting of an alloy of germanium and indium are fused to both sides of the surface. On cooling, thin regrown layers 5 and 6 consisting of p-conductivity type germanium are formed. As is seen from the drawing the p-type layers or electrodes completely penetrate the surface layer 2 of higher conductivity and form a rectifying junction with the inner bulk material of the wafer 1.

An ohmic base contact 7 is soldered to the member 1 laterally of the electrodes.

The transistor shown in Fig. 2 substantially corresponds to that shown in Fig. 1, but the conductivity types of corresponding parts are opposite. The semi-conductive member is made from indium-containing germanium having a specific resistance of 8 ohm-cm. It was heated in an atmosphere of a boron compound such as, for example, $BCl_3$ to obtain a p+ layer at the surface. In this instance, the majority carries are "holes." The emitter 3 and the collector 4 consist of a lead-antimony alloy, the regrown layers 5 and 6 of n-conductivity type germanium.

What is claimed is:

1. A transistor comprising a semi-conductive body of one conductivity type and having a given value of conductivity, the entire exposed surface of said body being of the same type as said one type but having a higher value of conductivity, and a pair of electrode-forming masses fused to opposite surfaces with the higher conductivity of said body and diffused within said body distances greater than the thickness of said previously-formed surface layer of higher conductivity and producing within said body spaced zones of the opposite conductivity type.

2. A semi-conductive device comprising a semi-conductive body having a portion of one conductivity type at a first value of conductivity, and electrode connections to said body including an electrode fused to said body and forming therewithin a portion of the opposite conductivity type thereby to produce a rectifying connection, substantially all of the exposed surface portions of said semi-conductive body exhibiting said one type of conductivity but possessing a second, higher value of conductivity, said rectifying connection being produced at a body portion at said first value of conductivity after the higher-conductivity surface portions have been formed.

3. A semi-conductive device comprising a semi-conductive body having an interior portion of one conductivity type and a first value of conductivity and a diffused surface portion substantially surrounding said interior portion and also of said one conductivity type but at a second value of conductivity, and means traversing said diffused surface portion and providing a rectifying connection to the interior portion of said semi-conductive body after said surface portion has been formed.

4. A semi-conductive device comprising a semi-conductive body having an interior portion of one conductivity type and a first value of conductivity and a diffused surface portion substantially surrounding said interior portion and also of said one conductivity type but at a second, higher value of conductivity, and an electrode fused to said body and traversing said previously-formed, diffused surface portion and forming a rectifying connection with said interior portion of said body.

References Cited in the file of this patent

UNITED STATES PATENTS

| | | |
|---|---|---|
| 2,597,028 | Pfann | May 20, 1952 |
| 2,603,693 | Kircher | July 15, 1952 |
| 2,603,694 | Kircher | July 15, 1952 |
| 2,770,761 | Pfann | Nov. 13, 1956 |
| 2,793,420 | Johnston et al. | May 28, 1957 |
| 2,829,075 | Pankove | Apr. 1, 1958 |